US009622275B2

(12) United States Patent
Jain et al.

(10) Patent No.: US 9,622,275 B2
(45) Date of Patent: Apr. 11, 2017

(54) SYSTEM AND METHOD FOR ALLOWING MULTIPLE DEVICES TO COMMUNICATE IN A NETWORK

(71) Applicant: QUALCOMM Incorporated, San Diego, CA (US)

(72) Inventors: Nikhil Jain, San Diego, CA (US); Manoj M Deshpande, San Diego, CA (US); Jose R Menendez, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 381 days.

(21) Appl. No.: 13/833,609

(22) Filed: Mar. 15, 2013

(65) Prior Publication Data

US 2014/0269497 A1    Sep. 18, 2014

(51) Int. Cl.
*H04W 76/02*     (2009.01)
*H04L 29/06*     (2006.01)

(52) U.S. Cl.
CPC ....... *H04W 76/021* (2013.01); *H04L 65/1069* (2013.01); *H04L 65/1093* (2013.01)

(58) Field of Classification Search
CPC ............. H04W 76/021; H04L 65/1069; H04L 65/1083–65/1093
USPC ................................................. 370/328, 352
See application file for complete search history.

(56) References Cited

U.S. PATENT DOCUMENTS

| 6,564,261 | B1 | 5/2003 | Gudjonsson et al. |
| 7,171,190 | B2 | 1/2007 | Ye et al. |
| 7,881,656 | B2 | 2/2011 | Khedouri et al. |
| 8,099,343 | B1 | 1/2012 | O'Neil et al. |
| 8,369,832 | B2 | 2/2013 | Thalapaneni et al. |
| 2004/0081088 | A1 | 4/2004 | Schinner et al. |
| 2004/0143671 | A1 | 7/2004 | Idnani |
| 2005/0113079 | A1 | 5/2005 | Guo |

(Continued)

FOREIGN PATENT DOCUMENTS

| DE | EP 2 088 736 A1 * 12/2009 ............. H04L 29/06 |
| EP | 1965567 A1    9/2008 |

(Continued)

OTHER PUBLICATIONS

Guenkova-Luy T., et al., "Service Mobility with SIP, SOP and MPEG-21", Telecommunications, 2007, CONTEL 2007, 9th International Conference on, IEEE, PI, Jun. 1, 2007 (Jun. 1, 2007), pp. 293-300, XP031113737, ISBN: 978-953-184-110-8 p. 294-p. 299.

(Continued)

*Primary Examiner* — Kan Yuen
*Assistant Examiner* — Richard Chang
(74) *Attorney, Agent, or Firm* — Smith Tempel Blaha LLC

(57) ABSTRACT

A method for allowing multiple devices to communicate includes initiating a multi-media communication session between a first device and a second device, each of the first and second device having access to at least one additional device, identifying at least a portion of the multi-media communication session to direct to the at least one additional device, the first device obtaining a unique identifier of the at least one additional device and directing the identified at least a portion of the multi-media communication session to the at least one additional device.

48 Claims, 5 Drawing Sheets

(56) References Cited

U.S. PATENT DOCUMENTS

| | | |
|---|---|---|
| 2006/0088149 A1 | 4/2006 | Sung |
| 2007/0121606 A1 | 5/2007 | Scheinert |
| 2007/0162971 A1 | 7/2007 | Blom et al. |
| 2007/0296805 A1 | 12/2007 | Tedenvall et al. |
| 2008/0013712 A1 | 1/2008 | Gopinath |
| 2008/0059627 A1 | 3/2008 | Hamalainen et al. |
| 2008/0123683 A1 | 5/2008 | Cheng et al. |
| 2009/0011743 A1 | 1/2009 | Johanson et al. |
| 2009/0103707 A1 | 4/2009 | McGary et al. |
| 2009/0143056 A1 | 6/2009 | Tang et al. |
| 2010/0015976 A1 | 1/2010 | Issa et al. |
| 2010/0088430 A1 | 4/2010 | Ton et al. |
| 2010/0215037 A1* | 8/2010 | Long et al. ............ 370/352 |
| 2010/0317322 A1 | 12/2010 | Underwood et al. |
| 2011/0164106 A1 | 7/2011 | Kim |
| 2011/0243141 A1 | 10/2011 | Blackburn et al. |
| 2012/0081502 A1 | 4/2012 | Naidu et al. |
| 2012/0144305 A1 | 6/2012 | Bekiares et al. |
| 2012/0225652 A1 | 9/2012 | Martinez et al. |
| 2013/0041954 A1 | 2/2013 | Kim et al. |
| 2013/0174237 A1 | 7/2013 | Zises |
| 2013/0339464 A1 | 12/2013 | Goudarzi et al. |
| 2014/0254434 A1 | 9/2014 | Jain et al. |
| 2014/0280706 A1 | 9/2014 | Jain et al. |

FOREIGN PATENT DOCUMENTS

| | | |
|---|---|---|
| KR | 20070078340 A | 7/2007 |
| WO | 2012009886 A1 | 1/2012 |
| WO | 2012087680 A1 | 6/2012 |

OTHER PUBLICATIONS

International Search Report and Written Opinion—PCT/US2014/023004—ISA/EPO—Jul. 3, 2014.

Ohta K., et al., "Adaptive terminal middleware for session mobility", Multimedia Signal Processing, 2002 IEEE Workshop on Dec. 9-11, 2002, Piscataway, NJ, USA, IEEE, May 19, 2003 (May 19, 2003), pp. 394-399, XP010642403, ISBN: 978-0-7803-7713-4 p. 394-p. 396.

Shacham R., et al., "Session Initiation Protocol (SIP) Session Mobility; rfc.5631.txt", Session Initiation Protocol (SIP) Session Mobility; RFC5631.TXT, Internet Engineering Task Force, IETF; Standard, Internet Society (ISOC) 4, Rue Desfalaises CH-1205 Geneva, Switzerland, Oct. 1, 2009 (Oct. 1, 2009), 18 Pages, XP015065702, [retrieved on Oct. 22, 2009] p. 4-p. 11.

Shacham R., et al., "Ubiquitous Device Personalization and Use: The Next Generation of IP Multimedia Communications", ACM Transactions on Multimedia Computing Communications andapplications, Association for Computing Machinery, US, vol. 3, No. 2, May 1, 2007 (May 1, 2007), pp. 1-20, XP007907295, ISSN: 1551-6857, DOI: 10.1145/1230812.1230818 p. 2-p. 13.

* cited by examiner

ID TABLE

| DEVICE ID | IP ADDRESS | ATTRIBUTES |
|---|---|---|
| 555.555.5555 | 192.168.nnn.nnn | Speakers: Yes/No<br>Microphone: Yes/No<br>Camera: Yes/No |
| 555.555.5555.tv | 192.168.nnn.nnn | Speakers: Yes/No<br>Microphone: Yes/No<br>Camera: Yes/No |
| 555.555.5555.pc | 192.168.nnn.nnn | Speakers: Yes<br>Microphone: Yes<br>Camera F/R: Yes/No<br>Display: Yes/No<br>Bluetooth: Yes/No<br>WiFi: Yes/No<br>NFC: Yes/No<br>3G/4G: Yes/No |
| 555.555.5555.pc.microphone | 192.168.nnn.nnn | |
| 555.555.5555.tablet | 192.168.nnn.nnn | Speakers: Yes<br>Microphone: Yes<br>Camera F/R: Yes/No<br>Display: Yes/No<br>Bluetooth: Yes/No<br>WiFi: Yes/No<br>NFC: Yes/No<br>3G/4G: Yes/No |

SYSTEM AND METHOD FOR ALLOWING MULTIPLE DEVICES TO COMMUNICATE IN A NETWORK

DESCRIPTION OF THE RELATED ART

Today, there are a wide variety of mobile communication devices and computing devices. There are some instances where it would be desirable to have a way of allowing two or more devices to interact using an activity common to the devices as the basis for the interaction. An example of a common activity is a telephone call occurring between the two devices. Many of these communication and computing devices are capable of communicating using Internet Protocol (IP) because they share, or can be made to share, a common (IP) addressing scheme. A subset of IP addressing and communication for voice communication is referred to as voice over IP (VoIP).

Currently, multiple devices are capable of communicating using IP addressing, but when a VoIP call is received on a particular device, the call is typically restricted to that device for the duration of the VoIP session. However, in some instances, it would be desirable to have a way to share at least portions of the VoIP session to more than one device.

SUMMARY

An embodiment of a method for allowing multiple devices to communicate comprises initiating a multi-media communication session between a first device and a second device, each of the first and second device having access to at least one additional device, identifying at least a portion of the multi-media communication session to direct to the at least one additional device, the first device obtaining a unique identifier of the at least one additional device and directing the identified at least a portion of the multi-media communication session to the at least one additional device.

An embodiment of a system for allowing multiple devices to communicate comprises a first phone located at a first location and a second phone located at a second location, the first phone and the second phone engaged in a multi-media communication session, an additional device at any of the first location and the second location accessible by any of the first phone and the second phone and at least a portion of the multi-media communication session being routed by any of the first phone and the second phone to at least one additional device at one of the first location and the second location.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 2 is a block diagram illustrating example information that may be contained in the database of FIG. 1.

DETAILED DESCRIPTION

Figure 1:
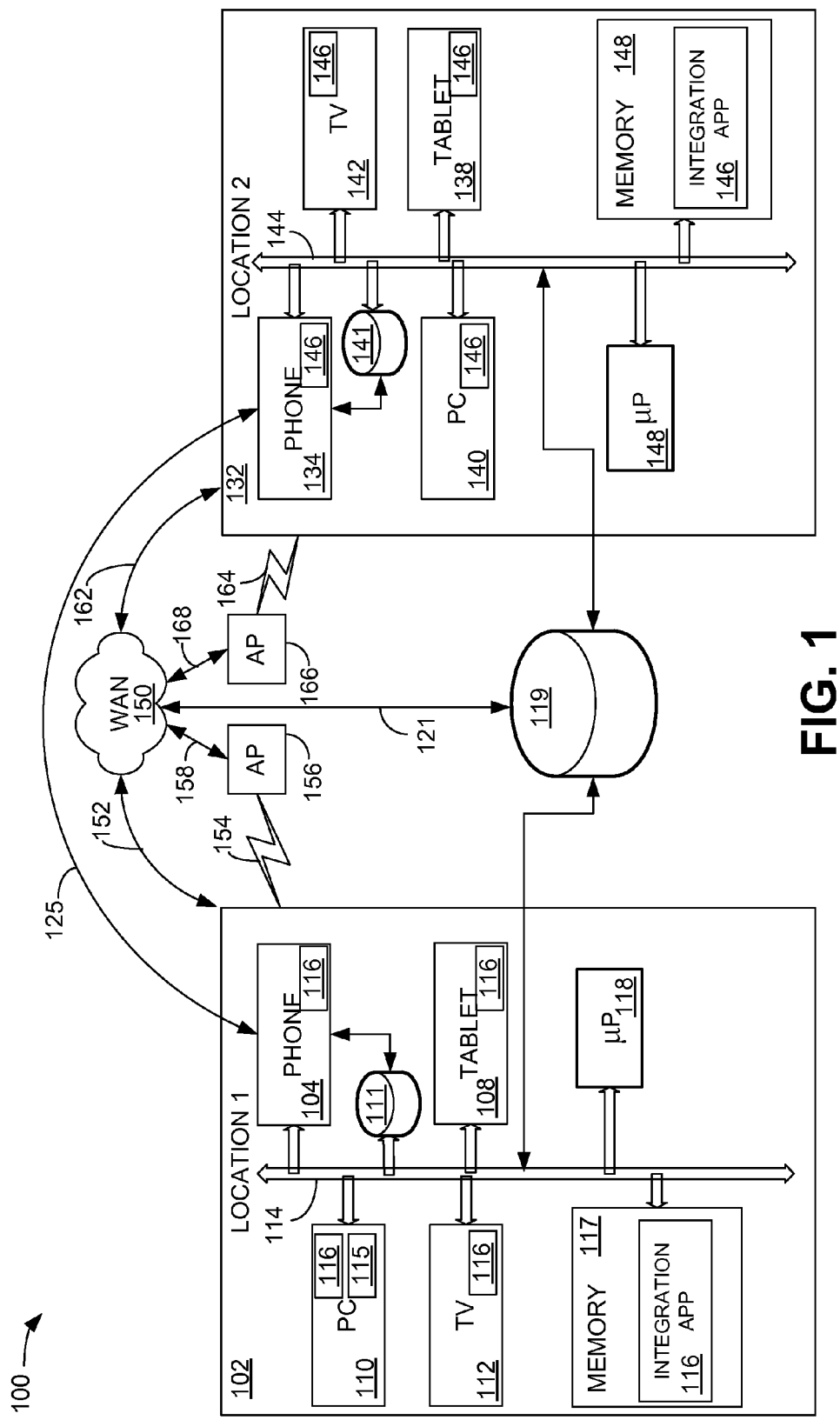
FIG. 1 is a block diagram illustrating a first embodiment of a system and method for allowing multiple devices to communicate in a network.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the term "routable device" refers to a device that is uniquely addressable using a universal addressing scheme, such as, for example, a phone number-based addressing scheme, an IP addressing scheme, a uniform resource location (URL) addressing scheme, or other unique addressing scheme.

As used herein, the terms "routable communication device" and "routable computing device" refer to a communication device or computing device that is uniquely addressable using a universal addressing scheme, such as, for example, a phone number-based addressing scheme, an IP addressing scheme, a uniform resource location (URL) addressing scheme, or other unique addressing scheme.

The system and method for allowing multiple devices to communicate in a network can be implemented in any routable communication device or computing device that engages in bi-directional communication with another routable communication device or computing device.

The system and method for allowing multiple devices to communicate in a network can be implemented in communication devices or computing devices that operate over one or more communication networks. As an example, the system and method for allowing multiple devices to communicate in a network can be implemented in a communication device or computing device that operates over RF frequencies referred to as the "Bluetooth" communication band, RF frequencies identified by the IEEE 802.11 b/g/n standard, in a communication device that operates over cellular communication frequencies, and can be implemented in communication devices that operate on any radio frequency on any type of network.

Although applicable to a number of different uses, in an embodiment, a system and method for allowing multiple devices to communicate in a network enables splitting or dividing at least portions of a VoIP session across multiple devices. For example, a VoIP call is received at a phone as one walks into their home. When the individual gets to their desk, it might be desirable to have any available video output of the VoIP session displayed on their computer or television, or have a camera associated with their computer capture video and send it to the other party, while the voice portion of the VoIP session remains on the phone. Using this scenario as an example, the incoming video is displayed on the call recipients' computer, and the outgoing video is transferred to the calling party's display, but the audio portion remains on the phone so that the call recipient can move away from the computer and not lose the audio connection.

FIG. 1 is a block diagram illustrating a first embodiment of a system and method for allowing multiple devices to communicate in a network. A system 100 comprises a first location 102 and a second location 132. The first location 102 comprises a number of individually addressable and connectable devices, such as a phone 104, a tablet computer 108, a personal computer (PC) 110 and a television 112. Each of the devices at the first location 102 also comprise an instance of an integration application 116. The integration application 116 provides a means to allow each of the devices at the first location 102 to communicate and interoperate with devices at the second location 132. Each of the devices is logically connected over a premises network 114. The premises network 114 can comprise a wired network, a wireless network, or a combination of wired and wireless networks. An example of a premises network 114 is a wireless fidelity (WiFi) network implemented using components capable of communicating and interoperating over one or more of the IEEE 802.11b/g/n standards. The term WiFi generally denotes a connection established in accordance with an IEEE 802.11b/g/n standard, but is also meant to include other wireless connections, such as Bluetooth, infrared (IR) and other connections.

In an embodiment, a stand-alone instance of the integration application 116 may also reside at the first location 102, connected to the network 114. As an example, the integration application 116 may comprise code stored in a memory 117 and executed by a processor 118 located on the network 114. In this manner, each of the devices at the first location 102 may access the integration application 116, even if the integration application 116 is not embedded in the particular device. This communication between and among the elements connected to the network 114 can occur using a peer-to-peer communication technology that allows remote procedure calls. An example of a peer-to-peer communication technology is AllJoyn.

Each of the devices at the first location 102 can be uniquely identified using an addressing scheme. Examples of such an addressing scheme include a phone number-based addressing scheme, an IP address based addressing scheme, a URL-based addressing scheme, or another addressing scheme that can assign a unique identifier to each device, and to individual components within each device. Using such an addressing scheme to uniquely identify each device, each of the devices is said to be a "routable device" in that one or more elements of a communication session, such as a VoIP call, can be routed to each device.

Similarly, the second location 132 comprises a number of individually addressable and connectable devices such as a phone 134, a tablet computer 138, a PC 140 and a television 142. Each of these devices is logically connected over a premises network 144. The premises network 144 is similar to the premises network 114. Each of the devices at the second location 132 also comprises an instance of an integration application 146. The integration application 146 provides a means to allow each of the connected devices at the second location 132 to communicate and interoperate with devices at the first location 102.

Each of the devices at the second location 132 can be uniquely identified using an addressing scheme as described above. Using such an addressing scheme, each of the devices is said to be a "routable device" in that one or more elements of a communication session, such as a VoIP call, can be routed to each device.

In an embodiment, a stand-alone instance of the integration application 146 may also reside at the second location 132, connected to the network 144. As an example, the integration application 146 may comprise code stored in a memory 147 and executed by a processor 148 located on the network 144. In this manner, each of the devices at the second location 132 may access the integration application 146, even if the integration application 146 is not embedded in the particular device. This communication between and among the elements connected to the network 144 can occur using a peer-to-peer communication technology that allows remote procedure calls. An example of a peer-to-peer communication technology is AllJoyn.

The first location 102 can also be connected to the second location 132 over one or more of a wide area network (WAN) and a local area network (LAN). In an embodiment, the first location 102 and the second location 132 can be connected to a network 150. In an embodiment, the network 150 can be a wide area network (WAN), such as the Internet, can be an Intranet, or can be any other wide area network.

The first location 102 can be connected to the network 150 using one or more connections. As an example, the first location 102 can be connected to the network 150 over a cellular-type connection, referred to herein generally as a 3G connection 152, but meant to include any and all cellular-type connections, and can be connected to the network 150 over a WiFi connection 154 via an access point 156. In an embodiment, the access point 156 can be a wireless access point or a wireless router operating in accordance with the IEEE 802.11b/g/n standard. The term WiFi generally denotes a connection established in accordance with an IEEE 802.11b/g/n standard, but is also meant to include other wireless connections, such as Bluetooth, infrared (IR) and other connections. The access point 156 can be connected to the network 150 over a connection 158. The connection 158 can include terrestrial wired and wireless connections, as known in the art. Similarly, the second location 132 can be connected to the network 150 using one or more connections. As an example, the second location 132 can be connected to the network 150 over a cellular-type connection, referred to herein generally as a 3G connection 162, but meant to include any and all cellular-type connections, and can be connected to the network 150 over a WiFi connection 164 via an access point 166. In an embodiment, the access point 166 can be a wireless access point or a wireless router operating in accordance with the IEEE 802.11b/g/n standard. The access point 166 can be connected to the network 150 over a connection 168. The connection 168 can include terrestrial wired and wireless connections, as known in the art.

For convenience of description, the phone 104 at the first location 102 can be arbitrarily referred to as a "first" phone and the phone 134 at the second location 132 can be arbitrarily referred to as a "second" phone. However, either phone can be either the first phone or the second phone. Similarly, one of the phones will also be referred to as a "calling phone" and the other phone will be referred to as a "called phone" with the understanding that either phone can be the calling phone or the called phone. Further, although referred to as a first location 102 and a second location 132, either of the locations 102 and 132 may be a first or second location. Moreover, either or both phone 104 and phone 134 may move from a location other than the first location 102 and the second location 132 to the locations 102 and 132. For example, the phone 104 may be a cellular phone that is carried by a user from location to location. In such an example, the phone 104 may be part of a call when located away from the location 102, and then may continue the call when the user arrives at the location 102.

The first location 102 and the second location 132 have access to a database 119. The database 119 may be internal to the first location 102 and the second location 132, or can be external to the first location 102 and the second location 132. The database 119 can also be accessible to any of the first location 102 and the second location 132 over the network 150 through a network connection 121. The database 119 contains unique device addresses and device capabilities that particularly identify the features and capabilities of each of the devices at the first location 102 and the second location 132.

For example, the integration application 116 organizes and collects the unique identification information related to the devices connected to the network 114. This information can include, for example a unique identifier for each device and the capabilities of each device. In an embodiment, this information is made available to the phone 104 and can be made a part of a database 111 associated with the phone 104. Such a database 111 can be, for example, an address book or other listing of devices and device attributes that is part of or accessible by the phone 104. This information can also be stored in the database 119.

Similarly, the integration application 146 organizes and collects the unique identification information related to the devices connected to the network 144. This information can include, for example a unique identifier for each device and the capabilities of each device. In an embodiment, this information is made available to the phone 134 and can be made a part of a database 141 associated with the phone 134. Such a database 141 can be, for example, an address book or other listing of devices and device attributes that is part of or accessible by the phone 134. This information can also be stored in the database 119.

In an embodiment, the phone 104 and the phone 134 engage in a multi-media communication session 125, such as a VoIP call. A VoIP call is used as an example with the understanding that other multi-media communication sessions are possible. For example only, assume that the phone 104 initiated the VoIP session by calling the phone 134. Once the call is established between the phone 104 and the phone 134, each of the phone 104 and the phone 134 connect to the other devices located at their respective first location 102 and second location 132, over respective networks 114 and 144. In other words, the phone 104 is made aware of all of the devices at the first location 102 and at the second location 132. Similarly, the phone 134 is made aware of all of the devices at the first location 102 and at the second location 132.

Each of the devices at each location 102, 132, being individually addressable and uniquely identifiable using a routable address allows any of the devices at the first location 102 and the second location 132 to be recognized and be in communication with the first phone 104 and the second phone 134. Further, it is possible that elements within each device may be further individually addressable and routable. For example only, a microphone 115 in the PC 110 may have a unique IP address. All of these unique routable addresses at a location may be made visible to and be made available to the devices at the other location.

In this manner, assuming a VoIP call is established between the phone 104 and the phone 134, the VoIP call can be used as a way of authenticating the communication session between the first phone 104 and the second phone 134. During the VoIP call, after an authentication is completed, it is possible for the phone 104 to engage a device at the second location 132 other than the phone 134 and to engage a device at the first location 102. Similarly, it is possible for the phone 134 to engage a device at the first location 102 other than the phone 104 and to engage a device at the second location 132. An example of such a use is a VoIP call that includes a voice component and a video component. Assuming the phone 104 initiates the call to the phone 134. Once the call is established, an instance of the integration application 116 on the phone 104 receives information from an instance of the integration application 146 on the phone 134. The information can include, for example, a list of the devices at the second location 132 that are connected to the premises network 144 and that are individually addressable and routable. Similarly, an instance of the integration application 146 on the phone 134 receives information from the instance of the integration application 116 on the phone 104. The information can include, for example, a list of the devices at the first location 102 that are connected to the premises network 114 and that are individually addressable and routable. In this manner, using an example of the phone 104 being the calling phone and the phone 134 being the called phone, the phone 134 can send an IP address of a device at the second location 132 to which the phone 134 would like the phone 104 to direct at least a portion of the multi-media communication session. Using this simple example, the second phone 134 can send the IP address of the TV 142 to the phone 104, thus requesting that the phone 104 direct a video portion of a multi-media communication session to the TV 142.

FIG. 2 is a block diagram illustrating example information that may be contained in the database 119 of FIG. 1. The database 119 may include an identification table 202 that includes information relating to unique routable addresses and capabilities of particular devices. As an example, the table 202 may include what are referred to as "routable addresses" for devices at the first location 102 and the second location 132. For example, the phone 104 or the phone 134 can be identified by a ten digit telephone number that is correlated to and has a corresponding unique IP address 192.168.nnn.nnn. The attributes of the device associated with the device ID and IP address are also listed in the database 119. As another example, the device ID "555.555.555.tv" can be associated with a unique IP address assigned to the TV 112 at the first location 102, with the TV 112 being associated to the phone 104 by the phone number (555.555.5555) of the phone 104. The device ID maps to an Internet Protocol (IP) address 192.168.nnn.nnn corresponding to "555.555.555.tv". The table 202 also contains attributes of the device associated with the subject device ID. The attributes define the capabilities of the subject device.

The device ID 555.555.5555.pc can be associated with a unique IP address assigned to the PC 110 at the first location 102, with the PC 110 being associated to the phone 104 by the phone number (555.555.5555) of the phone 104. The device ID maps to an Internet Protocol (IP) address 192.168.nnn.nnn corresponding to "555.555.555.pc". In this example, any of the devices may contain additional addressable elements. For example, the PC 110 may further contain another element or elements, such as a microphone. In this example, the microphone 115 (FIG. 1) may also be identified in the ID table 202 using, for example, the device ID 555.555.5555.pc.microphone. In this manner, a phone 134 at the second location 132 can use a routable address of a device (PC 110) at the first location 102 and send information to that device (PC 110).

At least portions of the information contained in the table 202 can be sent to each of the phone 104 and the phone 134 for storage in respective databases 111 and 141. In this manner, each of the phone 104 and the phone 134 can have access to the identifiers that uniquely identify the elements at each location 102 and 132. Each of the phones 104 and 134, or any of the devices at each location 102 and 132, can periodically query the database 119, 111 and/or 141 (FIG. 1) to obtain updated information on the devices at locations 102 and 132 from the table 202.

As an example, the phone 104 can periodically cause the table 202 to update as the phone 104 moves from location to location and may become associated with other devices. Similarly, the phone 134 can periodically cause the table 202 to update as the phone 134 moves from location to location and may become associated with other devices. An example of the technology that may be employed by the phone 104 and the phone 134 can be a universal plug-n-play application, or another technology that allows the discovery and interoperability of devices over a network.

Figure 3:
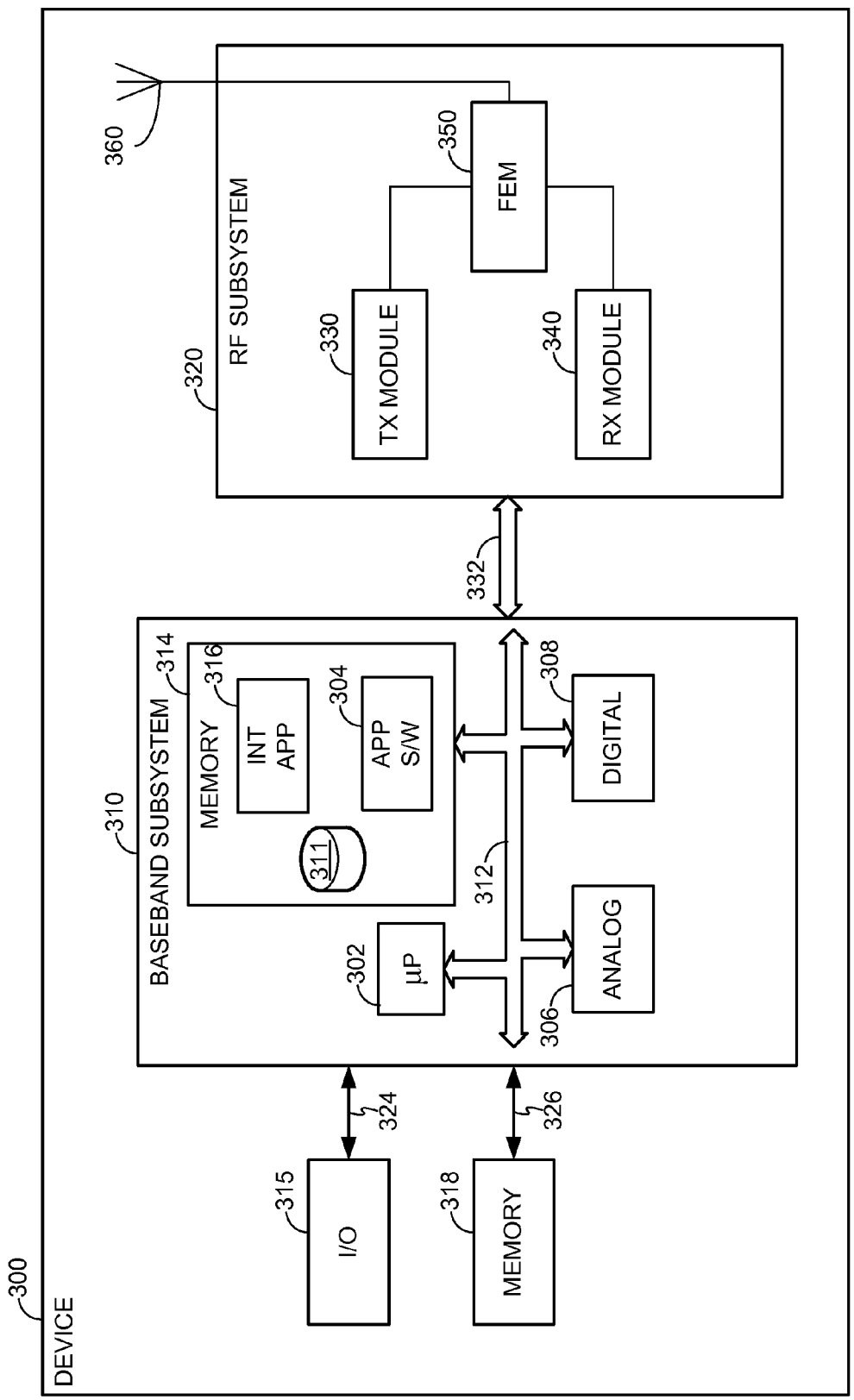
FIG. 3 is a block diagram illustrating an example of a device in which the system and method for allowing multiple devices to communicate in a network can be implemented

FIG. 3 is a block diagram illustrating an example of a device 300 in which the system and method for allowing multiple devices to communicate in a network can be implemented. While the device 300 is a generic example of any device located at the first location 102 or the second location 132, in an embodiment, the device 300 can be a wireless communication device, a portable cellular telephone, a WiFi enabled communication device, a computing device, a television, or can be any other communication or computing device. Embodiments of the system and method for allowing multiple devices to communicate in a network can be implemented in any communication device or computing device, as described above. The device 300 illustrated in FIG. 3 is intended to be a simplified example of a cellular telephone and is intended to illustrate one of many possible devices in which the system and method for allowing multiple devices to communicate in a network can be implemented. One having ordinary skill in the art will understand the operation of a portable cellular telephone, and, as such, implementation details are omitted. In an embodiment, the wireless device 300 includes a baseband subsystem 310 and an RF subsystem 320 connected together over a system bus 332. The system bus 332 can comprise physical and logical connections that couple the above-described elements together and enable their interoperability. In an embodiment, the RF subsystem 320 can be a wireless transceiver. Although details are not shown for clarity, the RF subsystem 320 generally includes a transmit module 330 having modulation, upconversion and amplification circuitry for preparing a baseband information signal for transmission, includes a receive module 340 having amplification, filtering and downconversion circuitry for receiving and downconverting an RF signal to a baseband information signal to recover data, and includes a front end module (FEM) 350 that includes diplexer circuitry, duplexer circuitry, or any other circuitry that can separate a transmit signal from a receive signal, as known to those skilled in the art. An antenna 360 is connected to the FEM 350.

The baseband subsystem generally includes a processor 302, which can be a general purpose or special purpose microprocessor, memory 314, application software 304, an instance of the integration application 316, a database 311, analog circuit elements 306, and digital circuit elements 308, coupled over a system bus 312. The system bus 312 can comprise the physical and logical connections to couple the above-described elements together and enable their interoperability. In an embodiment, the database 311 is similar to the database 111 and 141 described in FIG. 1 and can form part of an address book available to the wireless device 300.

An input/output (I/O) element 315 is connected to the baseband subsystem 310 over connection 324 and a memory element 318 is coupled to the baseband subsystem 310 over connection 326. The I/O element 315 can include, for example, a microphone, a keypad, a speaker, a pointing device, user interface control elements, and any other devices or system that allow a user to provide input commands and receive outputs from the device 300.

The memory 318 can be any type of volatile or non-volatile memory, and in an embodiment, can include flash memory. The memory 318 can be permanently installed in the device 300, or can be a removable memory element, such as a removable memory card.

The processor 302 can be any processor that executes the application software 304 and the integration application 316 to control the operation and functionality of the device 300. The memory 314 can be volatile or non-volatile memory, and in an embodiment, can be non-volatile memory that stores the application software 304 and the integration application 316.

The analog circuitry 306 and the digital circuitry 308 include the signal processing, signal conversion, and logic that convert an input signal provided by the I/O element 315 to an information signal that is to be transmitted. Similarly, the analog circuitry 306 and the digital circuitry 308 include the signal processing elements used to generate an information signal that contains recovered information. The digital circuitry 308 can include, for example, a digital signal processor (DSP), a field programmable gate array (FPGA), or any other processing device. Because the baseband subsystem 310 includes both analog and digital elements, it can be referred to as a mixed signal device (MSD).

Figure 4:
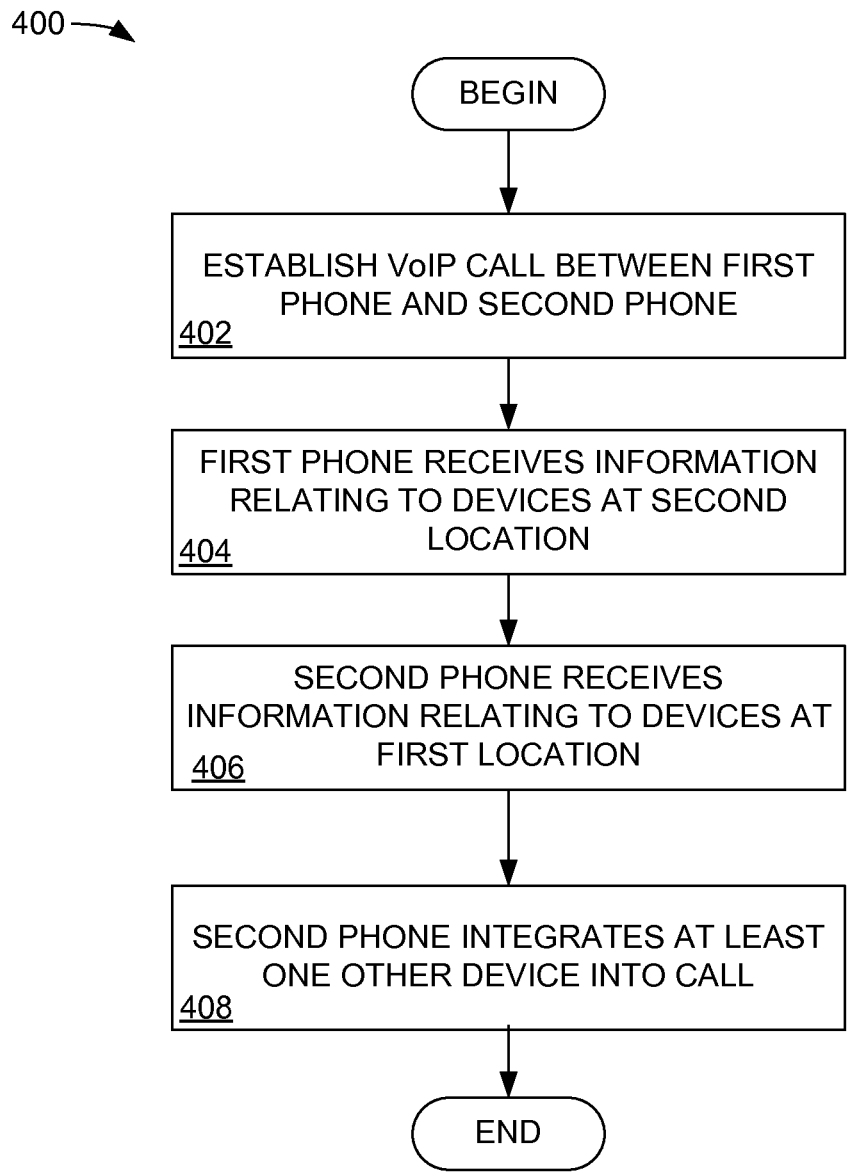
FIG. 4 is a flow chart illustrating an example of the operation of a method for allowing multiple devices to communicate in a network.

FIG. 4 is a flow chart illustrating an example of the operation of a method for allowing multiple devices to communicate in a network. In block 402, a multi-media communication session, such as a VoIP call, is established between a phone 104 and a phone 134. Establishing the multi-media communication session between the phone 104 and the phone 134 may include authenticating the phone 104 to the phone 134, and may include authenticating the phone 134 to the phone 104. Further, instead of mutual authentication, a third party may authenticate the phone 104 and the phone 134 independently.

In block 404, the phone 104 receives information from the phone 134 regarding devices located at the second location 132.

In block 406, the phone 134 receives information from the phone 104 regarding devices located at the first location 102.

In block 408, the phone 134 integrates one of the devices at the second location 132 into the call. For example, the phone 134 can send a video portion of the VoIP call to the PC 140 located at the second location 132. However, once a connection is established between the phone 104 and the phone 134, an implicit authentication is established between and among the devices at the first location 102 and the second location 132, thus allowing any of the devices at any of the first location 102 and the second location 132 to communicate.

In another example, after the multi-media communication session is established between the phone 104 and the phone 134, either of the phone 104 and the phone 134 can send a unique identifier, such as an IP address, of any additional device at either location 102 or location 132 instructing the opposite device to send at least a portion of the multi-media communication session to the additional device. Such switching may occur using IP addresses and universal datagram protocol (UDP) and/or transmission control protocol (TCP) sockets.

Moreover, any of the first phone 104 and the second phone 134 directing a portion of the multi-media communication session to an additional device at location 102 or location 132 also includes simulcasting a portion of the multi-media communication session to both the device and the at least one additional device.

Using device class information from the database 119, when a user installs an instance of the integration application 116, 146, on the particular device, the integration application and/or the user can identify the functionality available on top of the device class, and can label that particular instance of the application for that particular device e.g. VOIPid.label.DeviceClass. For example: 555.555.5555.pc, 555.555.5555.pc.microphone, 555.555.5555.tv, etc.

This labeling makes it possible for users to identify which devices they are adding to a VoIP session. With the ability to add multiple user devices to a VoIP session and identify them uniquely there are many other use cases, such as, for example, to show caller ID, Facebook photo, etc. on a PC or a TV, click conference call dial-in on PC but get audio on smartphone, setting device management for what devices used for when/what/status, set rules/filters for communications e.g. VoIP calls incoming from work only ring smartphone, VoIP calls incoming from non-work can also ring tablet, leveraging local devices in combination which separately wouldn't be able to handle the full content (e.g. text, audio, video) being transmitted during a VoIP session to create a better user experience.

An all-in-one "smart" device or add-on device can be implemented where all devices get an embedded computer (networking, processing, storage, OS, applications, etc. . . . ) so that all devices have similar functionality and therefore can handle a full VoIP session.

Figure 5:
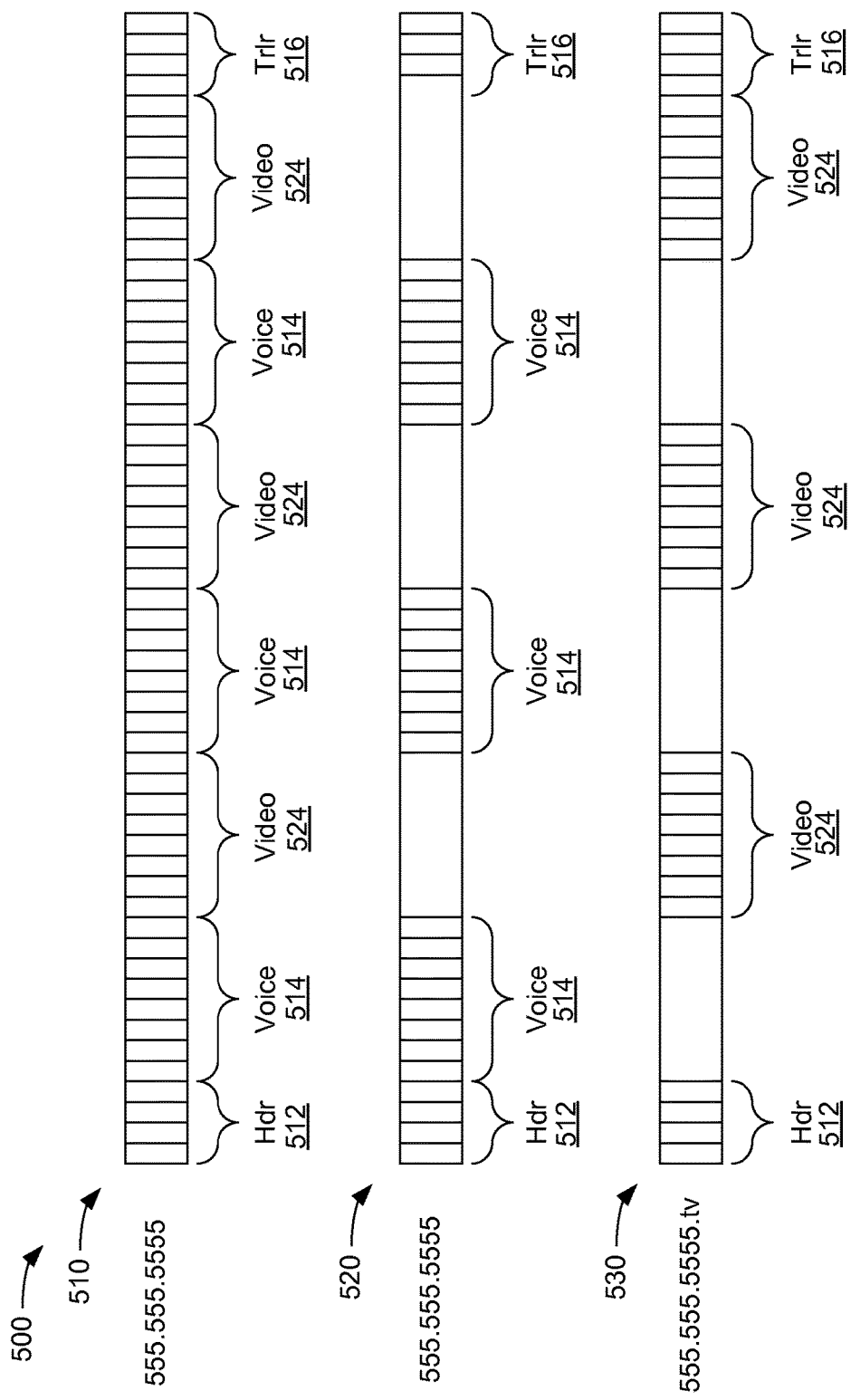
FIG. 5 is a graphical illustration showing an example VoIP call where a portion of the call is routed to an additional device.

FIG. 5 is a graphical illustration showing an example VoIP call where a portion of the call is routed to an additional device. The data stream 510 is a representative generic data stream that includes a header 512, voice information 514, video information 524 and a trailer 516. In an embodiment, the data stream 510 can be a packetized data stream, and is shown in a simplified manner for ease of illustration.

In this example, the data stream 510 can represent a VoIP call occurring between the phone 104 and the phone 134. The device ID 555.555.5555 refers to the phone 134 in this example. The data stream 510 includes both voice information 514 and video information 524. The phone 134 recognizes that both voice information 514 and video information 524 is contained in the data stream 510. The phone 134 also receives information from the phone 104 regarding the availability of other devices at the first location 102 and the phone 104 receives information from the phone 134 regarding the availability of other devices at the second location 132. The phone 104 is in communication with the other devices located at the first location 102 and the phone 134 is in communication with the other devices located at the second location 132.

In this example, the phone 134 can transfer a portion of the data stream 510 to another device. In this example, because the data stream 510 also comprises video information 524, the phone 134 may retain the voice information 514 and transfer the video information 524 to another device, such as the television 142. The data stream 520 illustrates the voice information 514 remaining at the phone 134 and the data stream 530 illustrates the video information 524 being transferred to the TV 142.

In view of the disclosure above, one of ordinary skill in programming is able to write computer code or identify appropriate hardware and/or circuits to implement the disclosed invention without difficulty based on the associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray Disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for conducting a multi-media communication session having an audio portion and a video portion between a first device and a second device, the second device having access to at least one additional device via a local area network, the method comprising:
   identifying a portion of the multi-media communication session between the first device and the second device to direct to the at least one additional device, the identified portion comprising a selected one of the audio portion and the video portion, a remaining portion of the multi-media communication session comprising the other of the audio portion and the video portion;
   the second device obtaining a unique identifier of the at least one additional device using an integration application local to the second device, the integration application configured to collect and organize information relating to additional devices accessible to the second device via the local area network;
   the second device further obtaining information related to device capability of the at least one additional device using the integration application; and
   the second device providing the unique identifier and the information related to the device capability of the at least one additional device to the first device, thereby prompting the first device to direct the identified portion of the multi-media communication session to the at least one additional device while continuing to direct the remaining portion of the multi-media communication session to the second device.

2. The method of claim 1, wherein initiating a multi-media communication session between a first device and a second device further comprises authenticating the first device and the second device.

3. The method of claim 1, wherein each of the first device, the second device and the at least one additional device are individually addressable using a routable address.

4. The method of claim 3, wherein an element located within the at least one additional device is individually addressable using a routable address.

5. The method of claim 3, wherein the routable address comprises an IP address that is correlated to a telephone number.

6. The method of claim 5, wherein the IP address is correlated with the information related to the device capability of the at least one additional device.

7. The method of claim 1, wherein the multi-media communication session is a voice-over-IP (VoIP) call.

8. The method of claim 7, wherein the VoIP call comprises first data and second data, and wherein the second data is transferred to the at least one additional device and the first data is not transferred to the at least one additional device.

9. The method of claim 1, wherein the first device directing the identified portion of the multi-media communication session to the at least one additional device comprises simulcasting the identified portion of the multi-media communication session to the second device and to the at least one additional device.

10. The method of claim 1, wherein the at least one additional device is chosen from a phone, a television, a tablet computing device, and a personal computing device.

11. A system for allowing a first phone at a first location to communicate with multiple devices at a second location, comprising:
    a second phone located at the second location, the first phone and the second phone engaged in a multi-media communication session having an audio portion and a video portion;
    an additional device accessible by the second phone via a local network;
    wherein the second phone is configured to participate in identifying a portion of the multi-media communication session between the first phone and the second phone to route to at least one additional device and to obtain a unique identifier and information related to device capability of the at least one additional device using an integration application local to the second phone, the integration application configured to collect and organize information relating to additional devices accessible to the second phone via the local area network, the identified portion comprising a selected one of the audio portion and the video portion, a remaining portion of the multi-media communication session comprising the other of the audio portion and the video portion; and
    wherein the second phone is configured to provide the unique identifier and the information related to the device capability of the at least one additional device to the first phone, thereby prompting the first phone to route the identified portion of the multi-media communication session to the at least one additional device while continuing to route the remaining portion of the multi-media communication session to the second phone.

12. The system of claim 11, wherein each of the first phone, the second phone and the at least one additional device are individually addressable using a routable address.

13. The system of claim 12, wherein an element located within the at least one additional device is individually addressable using a routable address.

14. The system of claim 12, wherein the routable address comprises an IP address that is correlated to a telephone number.

15. The system of claim 14, wherein the IP address is correlated with the information related to the device capability of the at least one additional device.

16. The system of claim 11, wherein the multi-media communication session is a voice-over-IP (VoIP) call.

17. The system of claim 16, wherein the VoIP call comprises first data and second data, and wherein the second data is transferred to the at least one additional device and the first data is not transferred to the at least one additional device.

18. The system of claim 11, further comprising authenticating the first device and the second device.

19. The system of claim 11, wherein the portion of the multi-media communication session being routed to the at least one additional device comprises simulcasting the portion of the multi-media communication session to the second phone and to the at least one additional device.

20. The system of claim 11, wherein the at least one additional device is chosen from a phone, a television, a tablet computing device, and a personal computing device.

21. A system for allowing multiple devices to communicate, comprising:
means for initiating a multi-media communication session having an audio portion and a video portion between a first device and a second device, each of the first and second device having access to at least one additional device via a local area network;
means for identifying a portion of the multi-media communication session between the first device and the second device to direct to the at least one additional device, the identified portion comprising a selected one of the audio portion and the video portion, a remaining portion of the multi-media communication session comprising the other of the audio portion and the video portion, for the second device obtaining a unique identifier and information related to device capability of the at least one additional device using an integration application local to the second phone, the integration application configured to collect and organize information relating to additional devices accessible to the second device via the local area network, and for the second device providing the unique identifier and the information related to the device capability of the at least one additional device to the first device; and
means for prompting the first device to direct the identified portion of the multi-media communication session to the at least one additional device while continuing to direct the remaining portion of the multi-media communication session to the second device.

22. The system of claim 21, wherein the means for initiating a multi-media communication session between a first device and a second device further comprises means for authenticating the first device and the second device.

23. The system of claim 21, wherein each of the first device, the second device and the at least one additional device are individually addressable using a routable address.

24. The system of claim 23, wherein an element located within the at least one additional device is individually addressable using a routable address.

25. The system of claim 23, wherein the routable address comprises an IP address that is correlated to a telephone number.

26. The system of claim 25, wherein the IP address is correlated with the information related to the device capability of the at least one additional device.

27. The system of claim 21, wherein the multi-media communication session is a voice-over-IP (VoIP) call.

28. The system of claim 27, wherein the VoIP call comprises first data and second data, and wherein the second data is transferred to the at least one additional device and the first data is not transferred to the at least one additional device.

29. The system of claim 21, wherein the first device directing the identified portion of the multi-media communication session to the at least one additional device comprises means for simulcasting the identified portion of the multi-media communication session to the second device and to the at least one additional device.

30. The system of claim 21, wherein the at least one additional device is chosen from a phone, a television, a tablet computing device, and a personal computing device.

31. A non-transitory computer-readable medium having computer code stored thereon for execution by a processor for allowing multiple devices to communicate, comprising:
a first code segment for initiating a multi-media communication session having an audio portion and a video portion between a first device and a second device, each of the first and second device having access to at least one additional device via a local area network;
a second code segment for identifying a portion of the multi-media communication session between the first device and the second device to direct to the at least one additional device, the identified portion comprising a selected one of the audio portion and the video portion, a remaining portion of the multi-media communication session comprising the other of the audio portion and the video portion;
an integration application configured to collect and organize information relating to additional devices accessible to the first device via a local area network;
a fourth code segment for the first device obtaining the unique identifier of the at least one additional device from the second device;
a fifth code segment for the first device obtaining information related to device capability of the at least one additional device from the second device; and
a sixth code segment for directing the identified portion of the multi-media communication session to the at least one additional device in response to the unique identifier and the information related to the device capability of the at least one additional device obtained from the second device while continuing to direct the remaining portion of the multi-media communication session to the second device.

32. The computer-readable medium of claim 31, wherein the first code segment for initiating a multi-media communication session between a first device and a second device further comprises a seventh code segment for authenticating the first device and the second device.

33. The computer-readable medium of claim 31, wherein each of the first device, the second device and the at least one additional device are individually addressable using a routable address.

34. The computer-readable medium of claim 33, wherein an element located within the at least one additional device is individually addressable using a routable address.

35. The computer-readable medium of claim 33, wherein the routable address comprises an IP address that is correlated to a telephone number.

36. The computer-readable medium of claim 35, wherein the IP address is correlated with the information related to the device capability of the at least one additional device.

37. The computer-readable medium of claim 31, wherein the multi-media communication session is a voice-over-IP (VoIP) call.

38. The computer-readable medium of claim 37, wherein the VoIP call comprises first data and second data, and wherein the second data is transferred to the at least one additional device and the first data is not transferred to the at least one additional device.

39. The computer-readable medium of claim 31, wherein the first device directing the identified portion of the multi-media communication session to the at least one additional device comprises simulcasting the identified portion of the multi-media communication session to the second device and to the at least one additional device.

40. The computer-readable medium of claim 31, wherein the at least one additional device is chosen from a phone, a television, a tablet computing device, and a personal computing device.

41. A method for sharing data among devices, comprising:
participating in a multi-media communication session having an audio portion and a video portion using a communication device;
the communication device using an integration application to collect and organize information relating to additional devices accessible to the communication device via a local network;
the communication device accessing at least one additional device located at the location at which the communication device is located via the local network;
the communication device obtaining information related to device capability of the at least one additional device via the integration application; and
transferring from the communication device an identified portion of the multi-media communication session to the at least one additional device, the identified portion comprising a selected one of the audio portion and the video portion, a remaining portion of the multi-media communication session comprising the other of the audio portion and the video portion, while continuing to participate in communicating the remaining portion of the multi-media communication session.

42. The method of claim 41, wherein the communication device and the at least one additional device are individually addressable using a routable address.

43. The method of claim 42, wherein an element located within the at least one additional device is individually addressable using a routable address.

44. The method of claim 42, wherein the routable address comprises an IP address that is correlated to a telephone number.

45. The method of claim 44, wherein the IP address is correlated with the information related to the device capability of the at least one additional device.

46. The method of claim 41, wherein the multi-media communication session is a voice-over-IP (VoIP) call.

47. The method of claim 46, wherein the VoIP call comprises first data and second data, and wherein the second data is transferred to the at least one additional device and the first data is not transferred to the at least one additional device.

48. A system for sharing data among devices, comprising:
a communication device configured to participate in a multi-media communication session having an audio portion and a video portion, the communication device having an integration application configured to collect and organize information relating to additional devices accessible to the communication device via a local area network;
at least one additional device, wherein the communication device is configured to access and obtain information related to device capability of the at least one additional device via the integration application; and
wherein the communication device is further configured to transfer an identified portion of the multi-media communication session to the at least one additional device, the identified portion comprising a selected one of the audio portion and the video portion, a remaining portion of the multi-media communication session including the other of the audio portion and the video portion, while continuing to participate in communicating the remaining portion of the multi-media communication session.

* * * * *